Patented June 1, 1943

2,320,882

UNITED STATES PATENT OFFICE 2,320,882

PROCESS FOR PREPARING FORMOGUANAMINES

Wilbur Null Oldham, Old Greenwich, Conn., assignor to American Cyanamid Company, New York, N. Y., a corporation of Maine No Drawing. Application August 30, 1941, Serial No. 409,127

5 Claims. (Cl. 260—248)

This invention relates to a method of preparing formoguanamines.

Formoguanamine has been prepared by reacting esters of formic acid with biguanide. However, this process does not operate smoothly with many substituted biguanides and it is necessary to use a solvent such as a lower paraffin alcohol with resultant difficulties in recovery due to the fact that many of the formoguanamines show appreciable solubility in the solvent used.

According to the present invention formoguanamines are prepared by condensing biguanide with formamide. No solvent is needed, the formamide is sufficiently high boiling so that the reaction may be carried out at higher temperatures, where it is desired, in order to accelerate the reaction, and the guanamines formed are substantially insoluble in formamide and are therefore readily recovered. The yields are also very high. For these reasons the present invention presents important advantages over the known methods of preparing formoguanamines.

It is another advantage of the present invention that substituted formoguanamines can be prepared readily by using the corresponding substituted biguanides. In this respect the process of the present invention is notatably different from that in which esters are used because when esters are employed some difficulty is encountered with substituted biguanides which do not react as rapidly in the absence of strong condensing agents such as metal alkoxides. The use of these condensing agents promotes hydrolysis of the ester and hence reduces the yield. When, however, formamide is used, the reaction proceeds readily without any condensing agents even when substituted biguanides are used.

The invention will be described in greater detail in conjunction with the following specific examples. The parts are by weight.

*Example 1.*—Formoguanamine

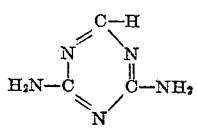

Twenty-five parts of biguanide were mixed with 75 parts of formamide and heated for one-half hour at 85–120° C. The guanamine precipitated out giving a product which sublimes about 300° C., the yield being 73%.

*Example 2.*—4-N-phenylformoguanamine

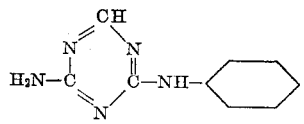

Sixty parts of 1-phenyl biguanide mixed with 210 parts of formamide are heated for an hour at 135° C., then raised to 180° C. The reaction is exothermic above 115° C. and the guanamine was obtained melting at 234° C., the yield being 91.5%. When a large excess of formamide, 600 parts to 163 parts of 1-phenyl biguanide is used and the reaction mixture heated for only half an hour at 115–150° C., a slightly purer product was obtained with a melting point of 237° C., the yield being about 89%.

*Example 3.*—4-N-β-naphthylformoguanamine

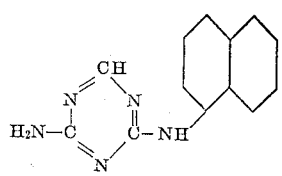

1-β-naphthyl biguanide was heated for five minutes with an excess of formamide. The guanamine formed immediately, the yield was quantitative and a product melting at 199° C. was obtained.

*Example 4.*—4-N-morpholinoformoguanamine

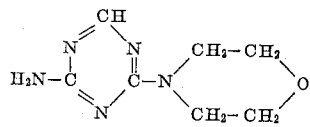

11.6 parts of N-biguanyl morpholine obtained by the neutralization of N-biguanyl morpholine hydrochloride in methanol solution with metallic sodium, was heated at 115–135° C. for one-half hour with 25 parts of formamide. The guanamine obtained melted at 223° C., the yield being 40.5%.

*Example 5.*—4-N-dimethylformoguanamine

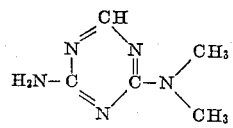

23.5 parts of 1,1-dimethyl biguanide was reacted with 42 parts of formamide being allowed to stand overnight and then heated twenty minutes at 110° C. The guanamine was obtained, melting at 192° C. and giving a yield of 55%.

What I claim is:

1. A method of preparing formoguanamines which comprises reacting a biguanide with formamide.

2. A method of preparing a 4-N-substituted formoguanamine which comprises reacting a 1-substituted biguanide with formamide.

3. A method of preparing 4-N-phenylformoguanamine which comprises reacting 1-phenyl biguanide with formamide.

4. A method of preparing 4-N-morpholinoformoguanamine which comprises reacting N-biguanyl morpholine with formamide.

5. A method of preparing formoguanamine which comprises reacting biguanide with formamide.

WILBUR NULL OLDHAM.